United States Patent [19]

Jennings, Jr.

[11] Patent Number: 4,828,030

[45] Date of Patent: May 9, 1989

[54] VISCOUS OIL RECOVERY BY REMOVING FINES

[75] Inventor: Alfred R. Jennings, Jr., Plano, Tex.

[73] Assignee: Mobil Oil Corporation, New York, N.Y.

[21] Appl. No.: 117,786

[22] Filed: Nov. 6, 1987

[51] Int. Cl.$^4$ .................... E21B 43/24; E21B 43/26
[52] U.S. Cl. ..................... 166/271; 166/267; 166/272; 166/308; 405/258
[58] Field of Search ........... 166/266, 267, 271, 272, 166/280, 281, 283, 305 D, 308; 299/11; 405/258, 266, 267

[56] References Cited

U.S. PATENT DOCUMENTS

| | | | |
|---|---|---|---|
| 3,108,439 | 10/1963 | Reynolds et al. | 166/305 D |
| 3,153,450 | 10/1964 | Foster et al. | 166/283 |
| 3,180,414 | 4/1965 | Parker | 166/281 |
| 3,205,944 | 9/1965 | Walton . | |
| 3,281,354 | 10/1966 | Scott et al. | 166/283 |
| 3,346,048 | 10/1967 | Strange et al. | 166/271 X |
| 3,682,246 | 8/1972 | Closmann | 166/271 X |
| 3,896,877 | 7/1975 | Vogt, Jr. et al. | 166/250 |
| 3,934,651 | 1/1976 | Nierode et al. | 166/283 X |
| 4,101,172 | 7/1978 | Rabbitts | 166/271 X |
| 4,305,463 | 12/1983 | Zakiewicz | 166/281 X |
| 4,501,329 | 2/1985 | DePriester | 166/292 |
| 4,549,608 | 10/1985 | Stowe et al. | 166/280 |
| 4,593,759 | 6/1986 | Penick | 166/261 |
| 4,598,770 | 7/1986 | Shu et al. | 166/245 |
| 4,623,021 | 11/1986 | Stowe | 166/280 X |

OTHER PUBLICATIONS

Warner, Don L., "Deep-Well Disposal of Industrial Wastes", *Chemical Engineering*, Jan. 4, 1965, pp. 73–78.

*Primary Examiner*—George A. Suchfield
*Attorney, Agent, or Firm*—Alexander J. McKillop; Charles J. Speciale; Charles A. Malone

[57] ABSTRACT

A process for disposing of fines produced with a substantially high viscosity oil. The viscosity of the oil will generally be less than 19 API degrees. Produced fines are mixed into a desired hydraulic fracturing fluid which fluid is used to fracture the formation. Once the formation has been fractured, additional fines in slurry form are pumped into the formation.

10 Claims, No Drawings

VISCOUS OIL RECOVERY BY REMOVING FINES

This application is related to Application Serial No. 059,357 which was filed on June 8, 1987 now U.S. Patent No. 4,739,832.

Field of the Invention

This invention is related to the removal of fines from very viscous heavy oil.

BACKGROUND OF THE INVENTION

In the United States and Canada many formations contain very viscous oils. These oils are often removed via thermal enhanced oil recovery methods. Formation fines and particles are often entrained in the viscous oil. Because the oils are viscous, conventional gravel pack techniques can not be used to effectively remove the fines when the viscous oil is produced. Utilization of conventional gravel packs would greatly impede the flow of the viscous oils therethrough and would result in a loss of production. For this reason, these viscous oils are produced to the surface with the fines entrained therein. Once on the surface, the fines are removed from the oil and discarded.

Disposal of these fines may present an environmental problem. Several ways have been devised to utilize these fines. One way in which the fines have been utilized is for road building. To accomplish this, the fines are deposited on the roadbed. Since these fines may contain a significant amount of oil, pollution of the environment is a concern.

Therefore, what is needed is a method for disposing of fines obtained from very viscous oil which disposal will minimize environmental damage.

SUMMARY

This invention is directed to a method for disposing of fines obtained by producing very viscous hydrocarbonaceous fluids from a formation. In the practice of this invention, an aqueous slurry is made of said fines. This slurry is of a consistency sufficient to be utilized in a hydraulic fracturing fluid. Said slurry is incorporated into said fracturing fluid. Thereafter, said fracturing fluid is injected or pumped into the formation under pressure and conditions sufficient to fracture said formation. Subsequently, the formation is fractured and the recovered fines are disposed in said well.

It is therefore an object of the present invention to use formation fines in a beneficial manner so as to avoid harm to the environment.

It is another object of this invention to use a detrimental by-product to an economic advantage.

It is a yet further object of this invention to reduce harm to the environment caused by formation fines.

DESCRIPTION OF PREFERRED EMBODIMENTS

In the practice of this invention an aqueous slurry is made from formation fines. Fines which can be used herein are obtained during the recovery of substantially viscous oils from a formation. Viscous oil as defined herein are those having an API gravity of 19 degrees or less. Although the size of these fines will vary, it is preferred to use fines of a size of from about 80 to about 400 mesh U.S. Sieve. The size of the formation fines is not critical. Fresh or salt water may be used for making the slurry. Said slurry should be of a consistency sufficient to be utilized in the hydraulic fracturing fluid. Where a more viscous fracturing fluid, e.g., a gel, is to be used greater amounts of fines can be carried in a given quantity of fracturing fluid.

Once the desired consistency has been obtained, the slurry is mixed with the selected fracturing fluid. Pumping pressure is applied to the fracturing fluid with slurry therein for a time sufficient to fracture the formation when the formation conditions are considered. This pumping pressure is applied to at least one injection well which penetrates the formation. More than one injection well can be utilized if deemed necessary. One hydraulic fracturing method which can be utilized is described by Stowe et al. in U.S. Pat. No. 4,549,0608 which issued on Oct. 29, 1985. Yet another hydraulic fracturing method which can be used is one where propping material is scheduled into a formation. This method is described in U.S. Pat. No. 3,896,877 which issued to Vogt, Jr. et al. on July 29, 1975. These patents are hereby incorporated by reference.

After fracturing the formation to the extent desired, in one embodiment the pressure on the formation is released and additional fines containing slurry is pumped into the injection well for disposal. This fracturing and slurry pumping process can be repeated until the formation is unable to contain additional slurry containing fines. When this occurs, the entire process can be initiated in another well until the desired quantity of fines has been disposed of.

In another embodiment, after fracturing the formation, additional slurry with fines therein is not pumped into the injection well. Instead, a thermal oil recovery method, e.g., a steam flood is initiated. Utilizing this method allows the production of hydrocarbonaceous fluids to the surface via at least one production well. Several methods can be utilized for heating the formation. The preferred method for heating the formation is to use a steam-flood. A thermal oil recovery process wherein steam is utilized to remove viscous oil from a formation which can be employed herein is described in U.S. Pat. No. 4,598,770. This patent issued to Shu et al. on July 8, 1986 and is hereby incorporated by reference. Another thermal oil recovery method wherein steam is utlized which can be employed herein is described in U.S. Pat. No. 4,593,759. It issued to Penick on June 10, 1986 and is incorporated by reference herein. Walton describes another thermal oil recovery process which can be used to recover hydrocarbonaceous fluids in U.S. Pat. No. 3,205,944. This patent issued on Sept. 14, 1965 and is hereby incorporated by reference. By this method hydrocarbons within the formation are auto-oxidized. Auto-oxidation occurs at a relatively low rate and the exothermic heat of reaction heats up the formation by a slow release of heat. Since during auto-oxidation, the temperature within the formation can be the ignition temperature of the hydrocarbon material within said formation, the auto-oxidation reactionis controlled to prevent combustion of the hydrocarbon material within the formation.

Obviously, many other variations and modifications of this invention as previously set forth may be made without departing from the spirit and scope of this invention as those skilled the art readily understand. Such variations and modifications are considered part of this invention and within the purview and scope of the appended claims.

What is claimed:

1. A method for disposing of fines obtained from substatially viscous hydrocarbonaceous fluids comprising:
   (a) making an aqueous slurry of the obtained fines of a consistency sufficient to be utilized in a hydraulic fracturing fluid;
   (b) incorporating said slurry into said fracturing fluid;
   (c) injecting said fracturing fluid into a formation under pressure and conditions sufficient to fracture said formation; and
   (d) fracturing said formation and thereby disposing of said fines in said formation by releasing the fracturing pressure on the formation and injecting additional said slurry into the formation.

2. The method as recited in claim 1 where the fines are of a size of from about 80 to about 400 mesh U.S. Sieve.

3. The method as recited in claim 1 where said fracturing fluid is injected into a well which penetrates said formation.

4. A method for fracturing a formation where formation fines are utilized comprising:
   (a) making an aqueous slurry of formation fines which slurry is of a consistency sufficient to be utilized in a gelled hydraulic fracturing fluid;
   (b) incorporating said slurry into said fracturing fluid;
   (c) injecting said fracturing fluid into a formation under pressure and conditions sufficient to fracture said formation; and
   (d) fracturing said formation and thereby disposing of said fines in said formation by releasing the fracturing pressure on the formation and injecting additional said slurry into the formulation.

5. The method as recited in claim 4 where said fracturing fluid is injected into said formation via an injection well and hydrocarbonaceous fluids are produced therefrom by a production well.

6. The method as recited in claim 4 where said fines are of a size of from about 80 to about 400 mesh U.S. Sieve.

7. The method as recited in claim 4 where a steamflood or auto-oxidation method is used to remove the hydrocarbonaceous fluids from the formation after fracturing.

8. A method for disposing of fines obtained from substantially viscous hydrocarbonaceous fluids comprising:
   (a) making an aqueous slurry of the obtained fines of a consistency sufficient to be utilized in a gelled hydraulic fracturing fluid;
   (b) incorporating said slurry into said fracturing fluid;
   (c) injecting said fracturing fluid into a formation under pressure and conditions sufficient to fracture said formation; and
   (d) fracturing said formation and thereby disposing of said fines in said formation by releasing the fracturing pressure on the formation and injecting additional gelled fracturing fluid and slurry into the formation.

9. The method as recited in claim 8 where the fines are of a size of from about 80 to about 400 mesh U.S. Sieve.

10. The method as recited in claim 8 where said fracturing fluid is injected into a well which penetrates said formation.

* * * * *

UNITED STATES PATENT AND TRADEMARK OFFICE
CERTIFICATE OF CORRECTION

PATENT NO. : 4,828,030

DATED : May 9, 1989

INVENTOR(S) : Alfred R. Jennings, Jr.

It is certified that error appears in the above-identified patent and that said Letters Patent is hereby corrected as shown below:

Col. 2, line 45, "utilzed" should read --utilized--.
Col. 2, line 58, "reactionis" should read --reaction is--.
Col. 3, Claim 1, line 2, "substatially" should read --substantially--.
Col. 3, claim 4, line 33, "formulation" should read --formation--.

Signed and Sealed this

Sixth Day of February, 1990

*Attest:*

JEFFREY M. SAMUELS

*Attesting Officer*     *Acting Commissioner of Patents and Trademarks*